United States Patent
Birkestrand

[19]

[11] Patent Number: 5,623,858
[45] Date of Patent: Apr. 29, 1997

[54] PRODUCTION END FINISHING MACHINE FOR TUBE AND BAR STOCK

[76] Inventor: Orville J. Birkestrand, 1435 Jersey Ridge Rd., Davenport, Iowa 52803

[21] Appl. No.: 413,243

[22] Filed: Mar. 30, 1995

[51] Int. Cl.⁶ ..................................................... B23B 5/16
[52] U.S. Cl. ................................ 82/113; 408/13; 408/104
[58] Field of Search .......................... 82/113, 153, 155; 408/5–7, 10, 12, 13, 103, 104, 105, 130, 135, 136

[56] References Cited

U.S. PATENT DOCUMENTS

| | | | |
|---|---|---|---|
| 2,067,626 | 1/1937 | Benninghoff | 408/105 |
| 2,954,851 | 10/1960 | Klancnik | 408/130 |
| 3,838,934 | 10/1974 | Petroff | 408/7 |
| 4,739,682 | 4/1988 | Birkestrand | 82/4 C |
| 5,069,094 | 12/1991 | Birkestrand | 82/121 |
| 5,197,362 | 3/1993 | Birkestrand | 82/113 |
| 5,393,176 | 2/1995 | Waring | 408/105 |

*Primary Examiner*—M. Rachuba
*Assistant Examiner*—Kenneth J. Hansen
*Attorney, Agent, or Firm*—Wagner & Middlebrook

[57] ABSTRACT

A machine for chamfering and otherwise finishing workpieces such as metal rods or tubes includes a base with a drive and spindle assembly, an assembly for securing a workpiece in position and an air-electric control system carried on the base. The drive and spindle assembly includes a housing carrying a rotatable spindle with a cutter, a quill surrounding said spindle and a cylinder with a piston connected to the quill for moving the spindle and quill axially. The drive structure includes an electric motor and a variable speed transmission. The control system includes a pedal for connecting high pressure air to operate the spindle. A vise and stop assembly secures a workpiece in position and includes an actuator connected to the control system and coordinated with the control system piston to secure the workpiece in position before cutting. Manual translation of the quill and spindle is also provided for through a gear and rack on the quill meshed to translate the quill while the piston is inoperative. A second embodiment uses a simplified control system to provide semi-automatic operation.

29 Claims, 10 Drawing Sheets

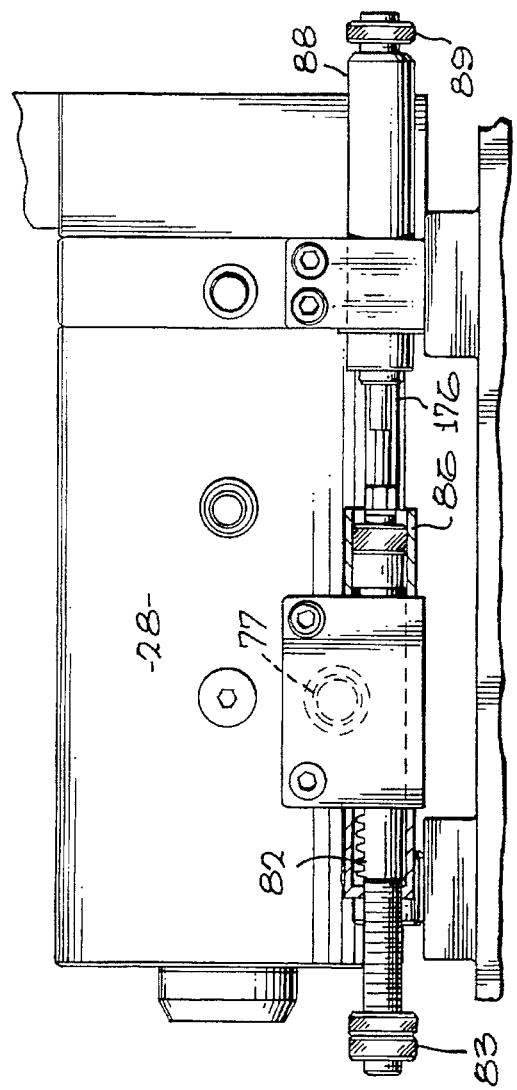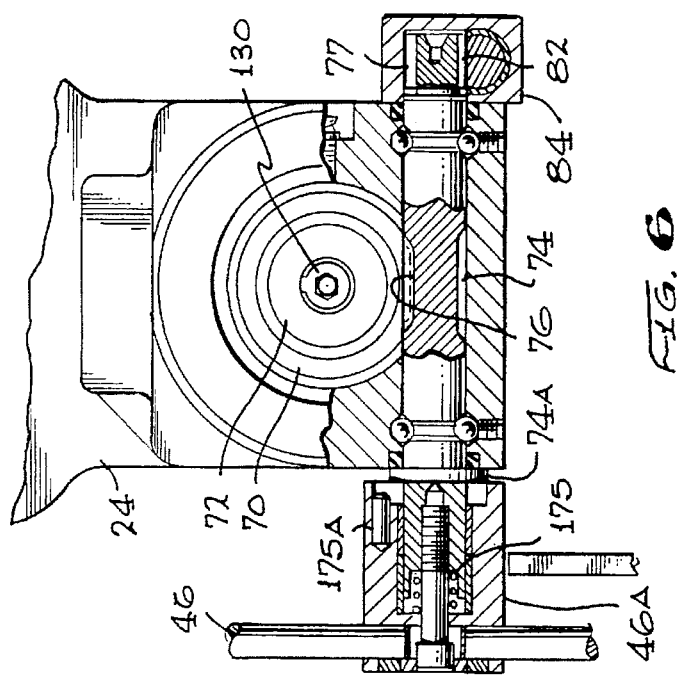

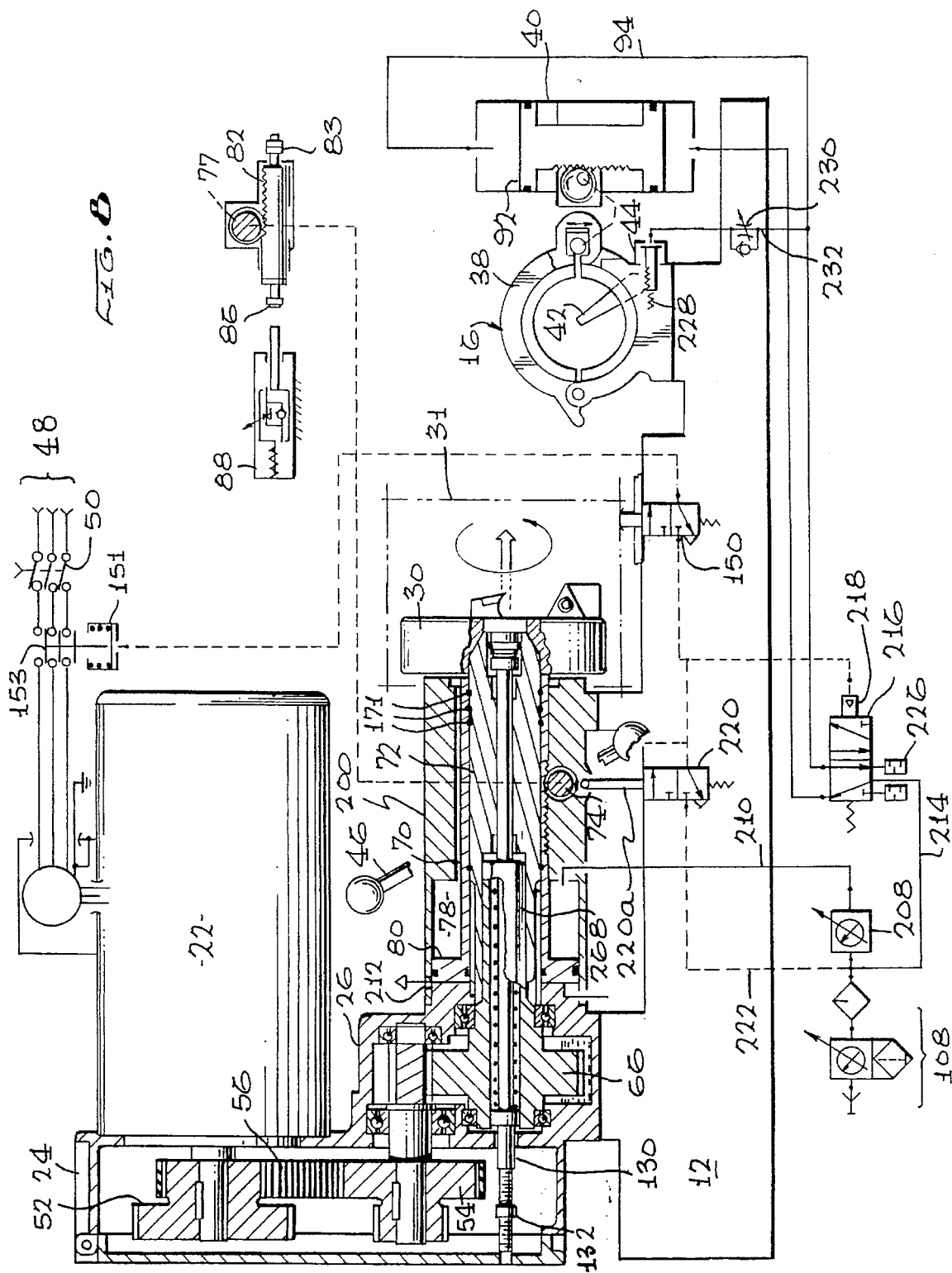

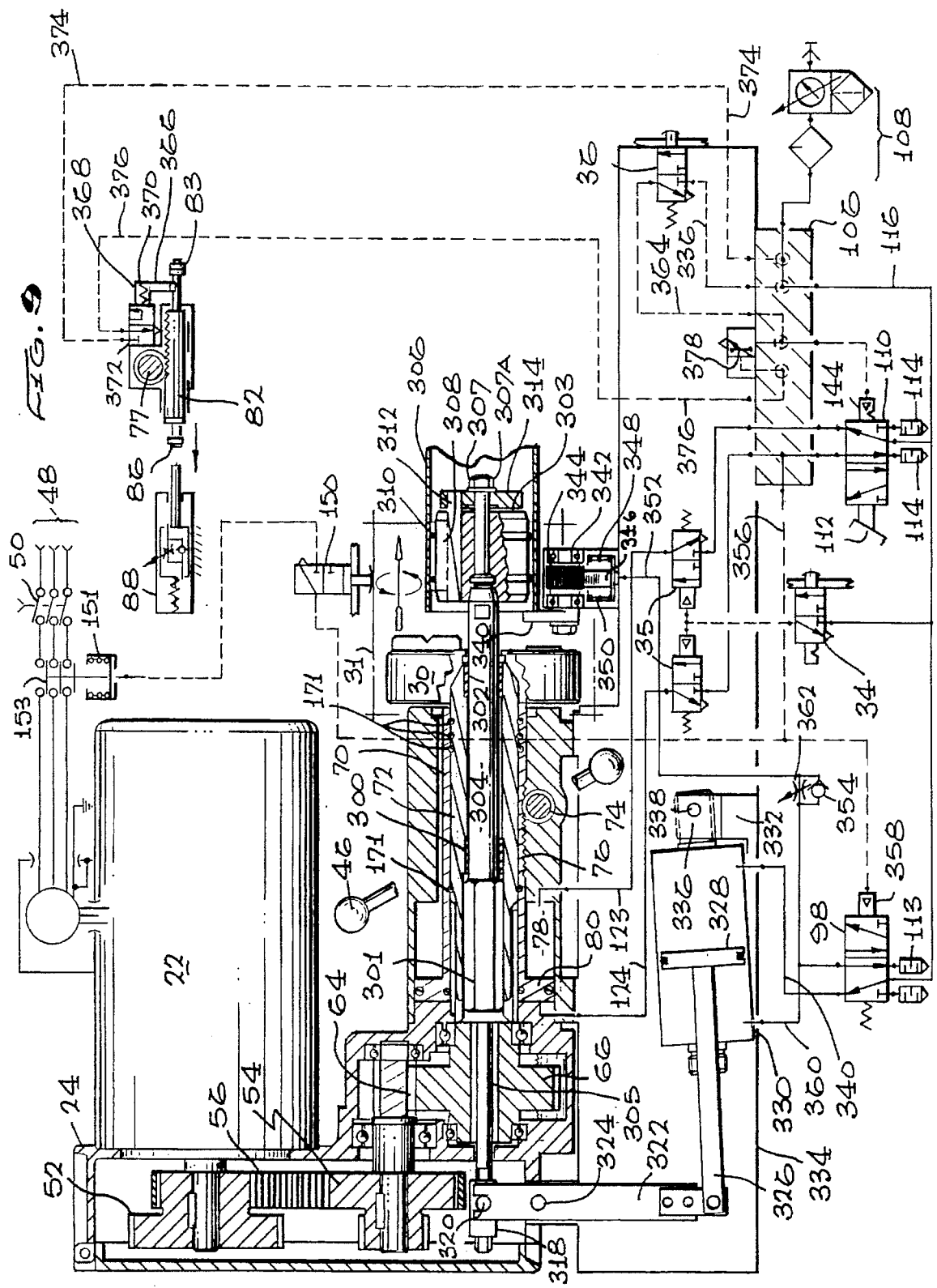

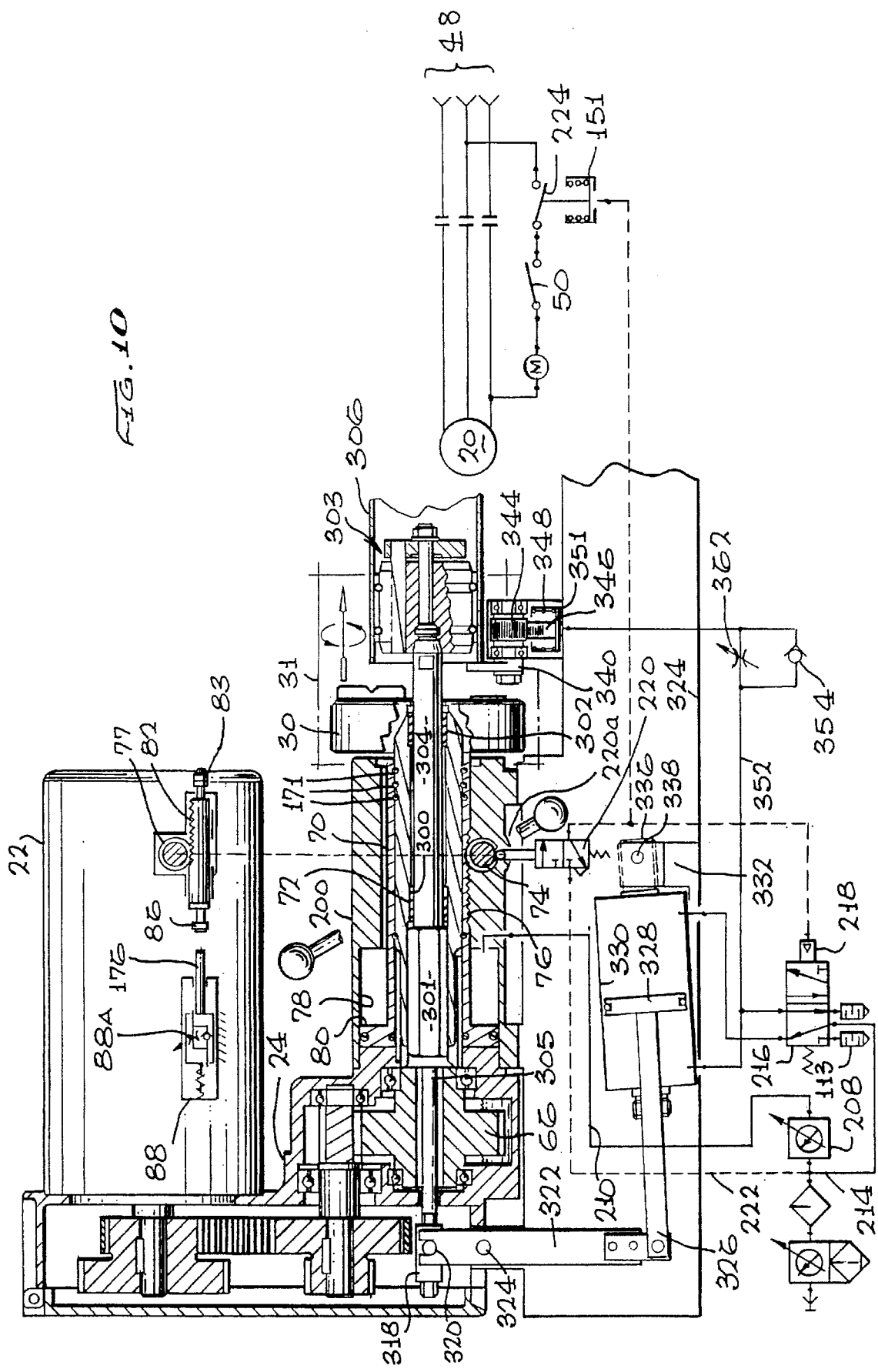

PRODUCTION END FINISHING MACHINE FOR TUBE AND BAR STOCK

BACKGROUND OF THE INVENTION

The present invention relates to metal working machines and more particularly to improvements in tube and rod end shaping and finishing machines.

In metal working, it is frequently necessary to finish the ends of tubes or rods by deburring, chamfering, flaring and the like and many types of machines, both bench or floor mounted and portable have been developed for such purposes as described in my U.S. Pat. No. 4,739,682 issued Apr. 26, 1988. A similar end finishing machine is shown in my U.S. Pat. No. 5,197,362 which also is capable of shaping the ends of rod or tube workpiece for a distance beyond the ends thereof.

There is also a need for an end finishing or chamfering machine suitable for high volume protection and which has a capability of running through repetitive cycles of locating a workpiece, securing it in position for chamfering or otherwise forming the end of the workpiece, moving the cutting or forming member away from the workpiece, and releasing the finished part for removal and replacement by another workpiece. While such a machine should cycle smoothly through the above operations, it should also be capable of manual operation for set-ups and limited production runs.

Where volumes are somewhat less, there is a place in the market for a semi-automatic machine of the type described above which is simpler, less expensive and yet capable of reasonable productivity where production runs are limited. There is also a need for such machines which are capable of securing tubular or pipe-type workpieces from the inside to:

1. permit automatic self centering of the work piece on high tolerance thin wall tubular stock;
2. work on pieces that must be accurately located from the i.d. surface in order to be machined correctly; and
3. work on those parts which cannot be gripped on the outside due to a delicate coating, plating or irregular obstruction (e.g., fins).

BRIEF DESCRIPTION OF THE INVENTION

Applicant has devised both automatic and semi-automatic end finishing and chamfering machines for rapidly finishing rod and tube ends which are relatively simple in design, durable, easily maintained and safe to work with. On a base are mounted a spindle and drive assembly, a vise and stop assembly and an adjustable height V-roller assembly. Also carried on the base is an air-electric control system connected to a source of compressed air.

The workpiece is, or may be, supported on its outboard end on a V-roller and is firmly held in position by means of a vise and stop assembly. A cutting or forming device (e.g., flaring, beading) is carried on a spindle which is rotated by a drive assembly consisting of an electric motor, a transmission including a pair of interchangeable double step gear belt pulleys with a drive belt and a speed reduction gear set. Surrounding and supporting the spindle is a quill which is formed with a piston carried in a cylinder, each side of which, on the automatic embodiment, is connected through air conduits to a manifold forming part of the air-electric control system. Operation of a pedal by the operator causes air under pressure to be supplied to actuators which arm the electrical system and position the workpiece, and to the piston which then moves, carrying the quill and the spindle to an operating position. Various arrangements, some of which include a mechanical and/or air return spring operate to urge the quill and spindle to the retracted position. A chip guard is connected to an interlock which is part of the control system and which disconnects power to the electric motor, thus assuring that the spindle does not turn on while the chip guard is open.

A vise and stop assembly is also connected into the control system and includes two air-operated actuators. The vise itself is a clamshell device which holds one of a number of suitable dies mated to the exterior configuration of a particular workpiece. An air valve responsive to operation of the pedal receives air under pressure which operates to clamp the vise in place.

A second actuator connected to the air supply through a restriction operates the stop which is normally spring biased to axially position the workpiece prior to its coming into contact with the cutting device. Once the vise has secured the workpiece, air supplied through a restriction in response to operation of the pedal, builds to a pressure overcoming the spring force and the stop is moved out of the way. An important feature of all embodiments of the applicant's machine is their repeatability. This is achieved through the use of a centerline drawbar which carries the cutting or forming tool. Travel of the drawbar is limited, at the retracted end by a solid metal-to-metal stop. Another metal-to-metal stop limits travel at the extended end. Since the stop members make contact metal to metal against a housing, the travel of the spindle is precisely limited by the stop adjustments.

While capability for relatively high speed operation is important, it is also necessary that the machine be capable of manual operation for set-up and for short runs. To accomplish this an "AUTO-Manual" switch is moved to the "Manual" position. In this mode the spindle turns as described and both sides of the actuating piston described above are connected to exhaust, thus preventing the piston from translating the spindle and quill.

The quill is in mesh with a gear which is, in turn, connected to a handle. The operator must move the handle axially to engage a detent to thereby cause the handle to directly engage the gear after which the handle is turned as desired to position the spindle and the cutting or forming tool.

The gear is always in mesh and rotatable with the quill and its position is representative of the axial position of the spindle. This gear is also connected to a second rack which moves an adjustable screw, making contact at a desired part of the spindle travel with a plunger on a hydro-check feed and rapid travel adjustment mechanism which sets the rapid traverse distance of the quill and spindle. It has been found convenient to provide an adjustable stop member movable with the second rack which provides a second solid metal to metal limit on movement of the second rack, hence, travel of the spindle in the extended direction. This is in addition to the aforementioned stop carried on the drawbar.

A "quick-stop" control button is connected to the high pressure air supply and flow through it is normally blocked. Should the operator desire to abort a cycle, pushing this button causes high pressure air to be connected to the pedal valve, cutting off pressure to the piston causing the quill and spindle to retract, and the system to return to its initial conditions.

Additional embodiments of the invention are quite similar in operation to those described above, but are designed to secure tube workpieces from the inside.

A substantial advantage of the machines described herein resides in the simplification of the structure wherein machine sequence is controlled by means of component sizing and transient pressures rather than by using the more cumbersome and costly extra discrete valves and limit switches normally required.

BRIEF DESCRIPTION OF THE DRAWINGS

This invention may be more clearly understood with the following detailed description and by reference to the drawings in which:

FIG. 6 is a fragmentary end view, partly in section, of the spindle and drive assembly of FIG. 5;

FIG. 7 is a rear side elevation of the spindle and drive assembly of FIGS. 3, 5 and 6;

FIG. 8 is a sectional drawing of the spindle and drive assembly including a schematic drawing of a control system for another embodiment of the invention;

FIG. 9 is a sectional drawing of the spindle and drive assembly including a schematic drawing of a control system for still another embodiment of the invention;

FIG. 10 is a sectional drawing of the spindle and drive assembly including a schematic drawing of a control system for a still further embodiment of the invention;

DETAILED DESCRIPTION OF THE PREFERRED EMBODIMENTS

Figure 1:
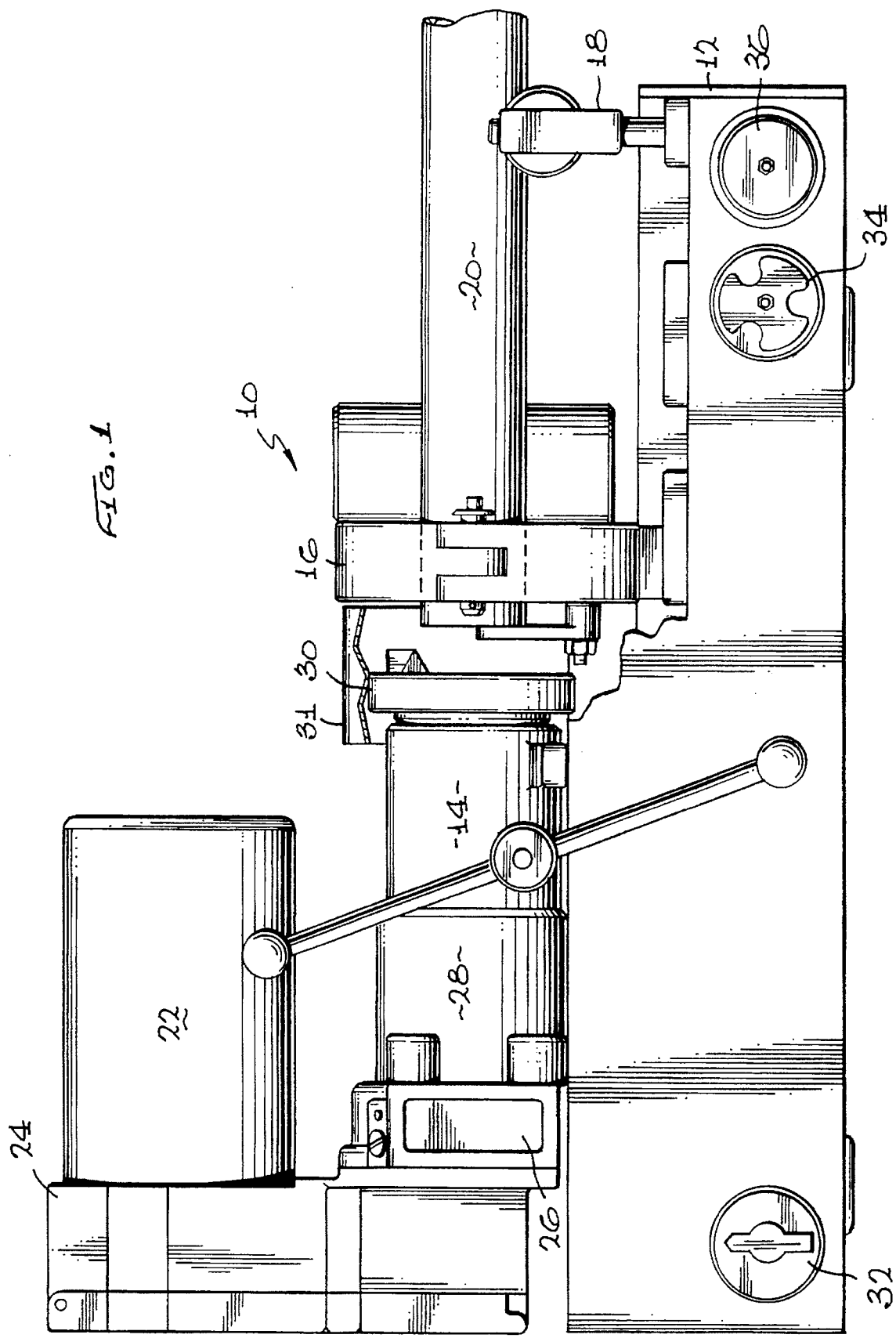
FIG. 1 is a side elevation of one embodiment of the chamfering and end finishing machine of the invention.

Referring now to FIG. 1, the end finishing and chamfering machine 10 includes a base 12 upon which are mounted a spindle and drive assembly 14, a vise and stop assembly 16 and an adjustable height V-roller assembly 18. A workpiece 20 which is shown as tubular bar, but which may be either bar workpiece or tubular workpiece, is supported in the vise and stop assembly 16 and the V-roller assembly 18. The spindle and drive assembly 14 includes an electric motor 22, a gear belt drive system 24, a gear box 26 and a spindle assembly 28 which carries a cutter cartridge 30 and a chip guard 31. A number of control switches are carried on the base 12 including an electrical off-on switch 32, an Auto-Manual switch 34 and a Q-stop switch 36, the switches and their functions being discussed below.

Figure 2:
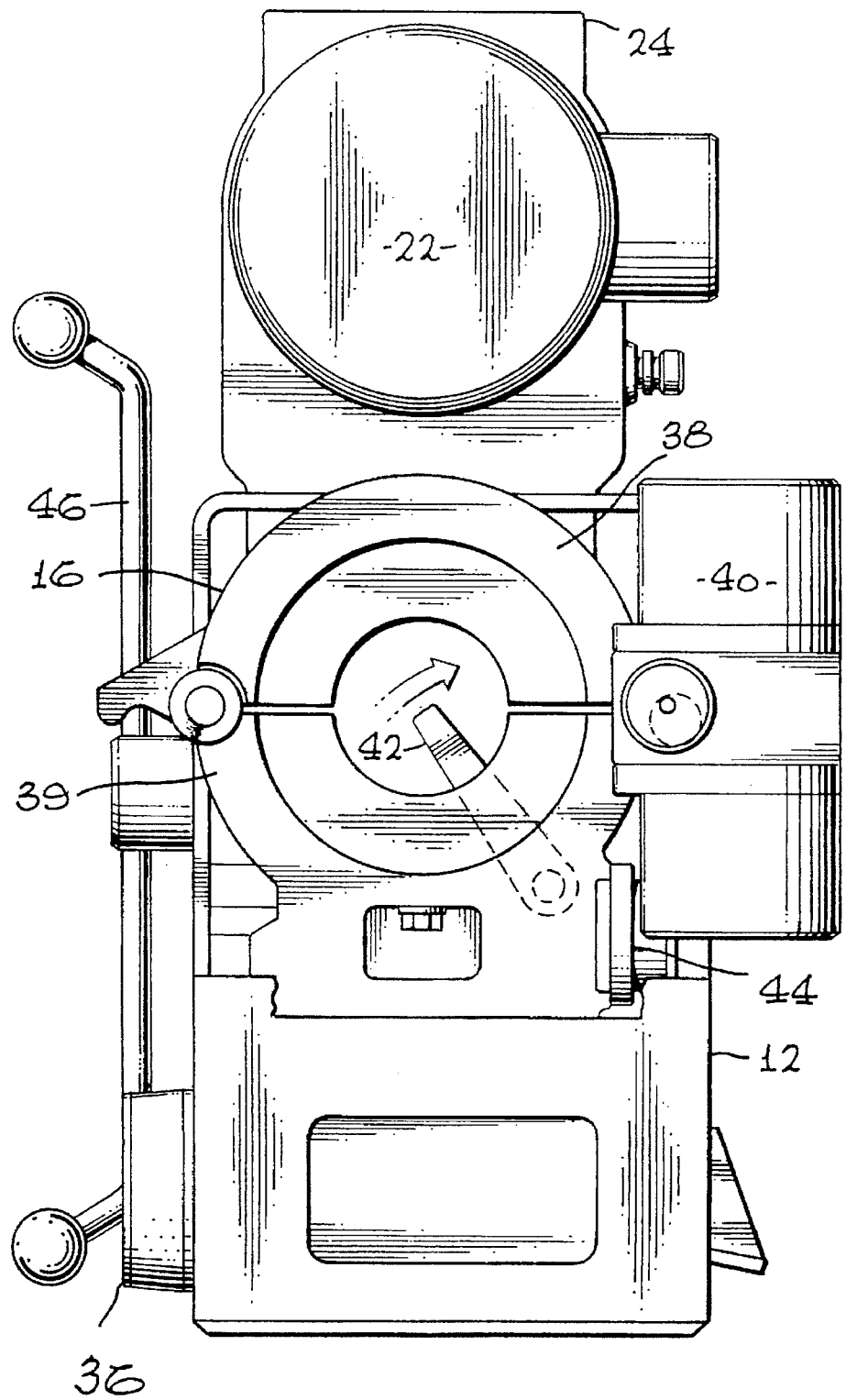
FIG. 2 is a right end elevational view of the machine of FIG. 1.

FIG. 2 is a right end elevational view of the machine shown in FIG. 1 and shows the base 12, the electric motor 22, the housing for the gear belt drive system 24, the vise and stop assembly 16 including a clam shell type vise 38 with a die 39 and a vise actuator 40, and a stop 42 with a stop actuator 44. Also shown are a lever 46 for manually moving the cutter assembly 30 and its hub, and also the Q-stop switch 36.

Figure 3:
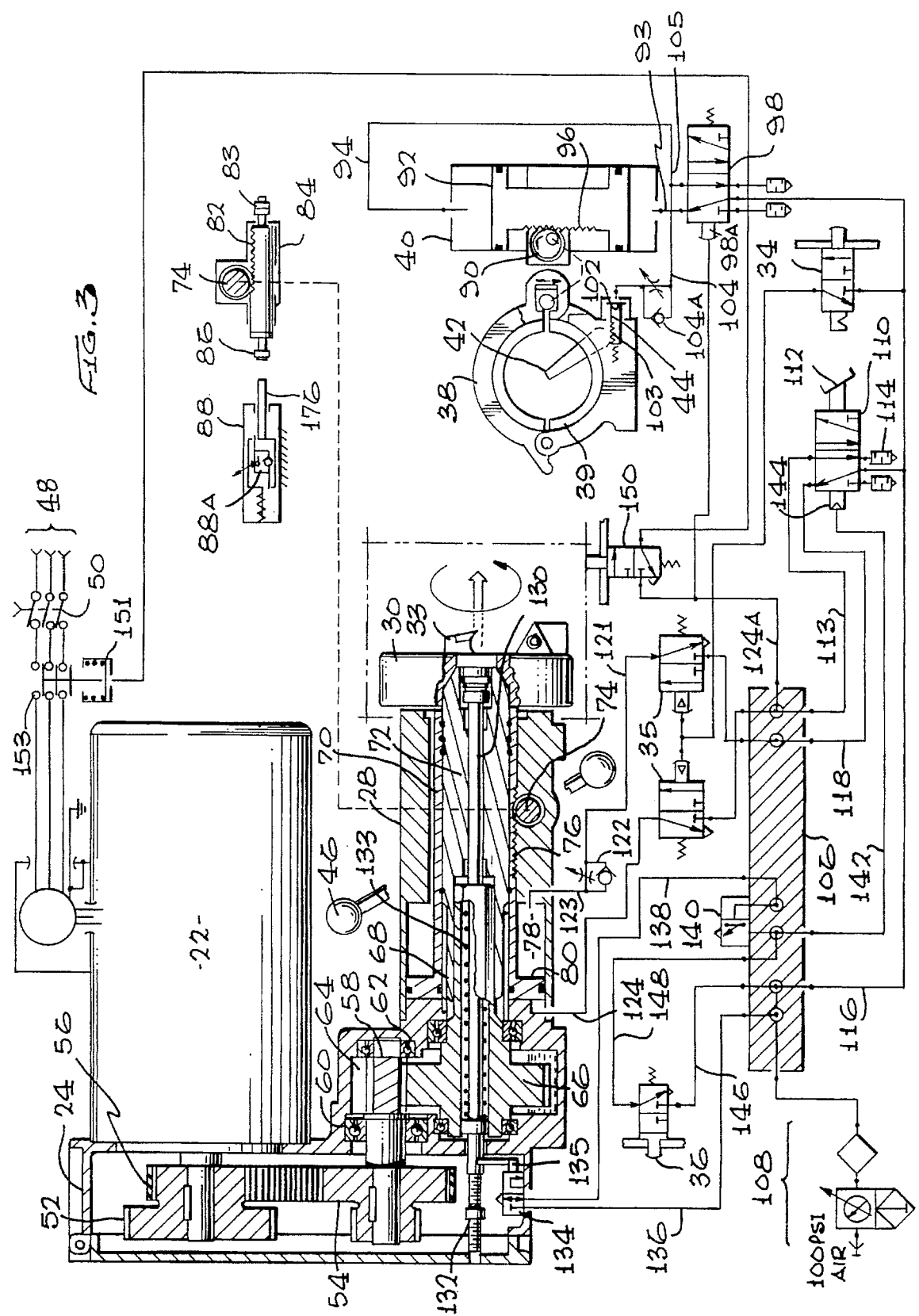
FIG. 3 is a sectional drawing of the spindle and drive assembly including a schematic drawing of the control system for the machine of FIGS. 1 and 2.

FIG. 3 includes a sectional drawing of its spindle assembly 28 and the belt drive 24 with a schematic diagram of the control system. The electric motor 22 is connected to a 3-phase power source 48, a switch 50 and drives the belt drive system which includes two double step gear belt pulleys 52 and 54 and a toothed belt 56, the pulleys being movable to alternate positions to provide any of eight possible gear ratios. Driven pulley 54 is carried on a shaft 58 supported in ball bearings 60 and 62 and which includes a small gear 64 in mesh with a larger gear 66 formed on a spindle shaft 68 carried in bearings supported in the housing of spindle assembly 28. Shaft 68 is keyed for rotation to a spindle 72. A drive gear 74 engages a rack 76 forming part of quill 70. Because during operation, the spindle 72 may be subject to heavy and sometimes interrupted side forces, this machine must be unusually stiff radially. To accommodate these side loads, integral ball bearings are built into the spindle 72 and quill 70. The bearing races are cut directly into the spindle 72 and quill 70 with a large number of ball bearings carried in the races.

Also formed in the housing of spindle assembly 28 is a cylinder 78 in which is carried a piston 80 forming part of quill 70. Fluid (in this case, air) under pressure is connected to opposite sides of piston 80 to drive quill 70 and spindle 72 axially. Quill 70 and spindle 72 may also be moved axially through manual rotation of lever 46 which is movable into direct connection with gear 74. Spindle 72 carries cutter cartridge 30 which is axially movable with cutter blade 33 or other suitable forming tool to contact the workpiece 20 (FIG. 1) to effect the desired chamfering or other end finishing operation. Spindle 70 and cutter cartridge 30 (which is conventional) rotate with gear 66. A large number of possible spindle speeds are possible with the gear combinations afforded by the belt drive system 24 in combination with possible variations in the speed of motor 22 (e.g. 3450 rpm or 1725 rpm). In addition, gear set 64, 66 provides a very large gear reduction, so that the spindle rotational speed may be reduced to the order of 120 rpm.

Also driven by gear 74 is a rack 82 carried in a housing 84 attached to or formed in the rear side of spindle assembly 28. Rack 82 drives an adjustable screw 86 which, when adjusted, is locked in place by a locknut. Screw 86 impacts a hydro-check feed and rapid travel adjustment mechanism 88 which includes an adjustable restriction 88A which sets the traverse speed of quill 70 and spindle 72. A stop 83 is carried on an extension of rack 82 and serves as a convenient and positive metal-to-metal limit on the travel of the spindle 70 in the extended direction.

The clam shell type vise 38 carries a die 39 of suitable size and configuration to secure and support the workpiece 20. The vise and stop assembly 16 also includes the vise actuator 40, the stop 42 and the stop actuator 44. Vise 38 is opened and closed by means of an eccentric 90 operated by vise actuator 40. Actuator 40 includes a cylinder and a piston 92 in the cylinder responsive to air pressure in conduit 94. Air acting on the top side of piston 92 pushes piston 92 downwardly, carrying a rack 96 which moves eccentric 90 to close vise 38. Air flow to piston 92 is controlled by means of a clamp valve 98 movable by an actuator 98A. Valve 98 being connected to control air to a piston 102 in the stop actuator 44. Piston 102 is connected to translate a rack 103 to move stop 42 as shown in FIG. 2. An adjustable restriction and check valve unit 104 including check valve 104a limits the build-up of air pressure through line 105 against piston 102 so that stop 42 is not moved away until vise 38 has fully clamped the workpiece 20 in place.

An air manifold 106 is connected to a source of air under pressure through a commercially available filter-regulatorlubricator 108. Applicant has used units available from SMC Company of 3011 N. Franklin Rd. Indianapolis, Ind. 46226, part no. NAL-2000. Connected to manifold 106 are a number of valves including a valve 110 operated by a foot pedal 112. Valve 110 directs air under pressure to various parts of the machine as described below and also includes passages directing air to be exhausted through baffled exhaust ports 114. With valve 110 and the 3-way auto-manual valve 34 in the position shown, air under pressure flows from the source through a conduit 116 to valve 110, to a conduit 118 and is blocked at the double valve 35. Air pressure on both sides of piston 80 through lines 123 and 124 is exhausted at double valve 35. Piston 80 and spindle 70 are then enabled to move axially through manual operation of handle 46, gear 74 and rack 76.

When Auto-Manual Valve 34 is moved to the "auto" position, air pressure in line 116 is communicated to the valve actuators on double valves 35, switching these valves to the opposite position. Subsequent operation of pedal 112, in addition to quickly moving air valve 98 to operate the vise 38 and then to move stop 42 as described, and actuator 151 to arm the circuit of motor 22 as discussed below, connects air line 116 through valve 110 to line 113, through the left side of double valve 35 and line 124 to build pressure against the left side of piston 80. The pressure required to move piston 80 is substantially greater than that required to move valve 98 and actuator 151. At this time, line 123 is connected through bleed and check valve unit 122, and line 121, the right side of double valve 35 and line 118 to one of the exhaust ports 114. This permits piston 80 and quill 70 to move to the right at a rate limited by the restriction in unit 122, compressing spring 133, and carrying drawbar 130 to the right to perform the desired cutting or forming operation.

At the end of the cutter or forming operation, the centerline mounted drawbar 130 will have carried a stop 132 to the right until it contacts an arm 135 on a return valve 134. Arm 135 is spaced a small distance from the housing. As stop 132 moves to the right, it causes arm 135 to come to rest metal-to-metal against the housing, tripping return valve 134. With return valve 134 in the position shown, flow is blocked. When return valve 134 is tripped by stop 132, communication is opened between conduits 136 and 138, permitting full air pressure to be supplied through a time delay valve 140 which imposes a short time delay before permitting air pressure to increase through a conduit 142 to a value sufficient to operate an actuator 144 which forces valve 110 and foot pedal 112 back to the position shown (original position before pedal 112 is operated). At essentially the same time, rack 82 will have moved stop 83 against housing 84, which also positively stops rightward movement of the spindle assembly.

With pedal 112 and valve 110 moved back to the illustrated position, lines 124A and 113 are connected to an exhaust port 114. This results in quickly releasing air pressure from the actuator on clamp valve 98 switching it to the position shown causing the air pressure on the top side of position 92 and on the piston 102 to be exhausted quickly through valve 98. At the same time (with Auto-Manual valve 34 remaining in the "Auto" position), high pressure air flows through line 116, line 118, the right side of double valve 35, line 121, across the check valve in unit 122, and line 123 to cylinder 78. The left side of piston 80 is connected through line 124, the left side of double valve 35, manifold 106, line 113, valve 110 and air exhaust port 114 causing piston 80 to begin moving to the left.

At this point there is substantial pressure (such as 100–120 psi) remaining on the left side of piston 80. This pressure will dissipate through exhaust port 114 over a finite period during which piston 80 moves to the left but will retain at least 40 psi until piston 80 is moved all the way to the left. This pressure is enough to keep actuators 98A and 151 actuated, allowing the spindle 72 to always fully retract before the workpiece is unclamped, the stop 42 is moved back and the motor stops, achieving the desired sequencing without requiring the usual extra control valve.

As this pressure through line 124 drops in value it reaches a point where it can no longer hold actuator 98A in position and clamp valve 98 switches to its original position, connecting high pressure to the bottom side of piston 92 and opening vise 38. With check valve 104A forced open, stop 42 moves quickly back to its original position. Also, at this time spring loaded piston 151 retracts, opening switch 153 and motor 22 stops.

The work on workpiece 20 is then completed and the workpiece removed from the vise 38. A new workpiece can then be placed in position against the stop 42. Operating the pedal 112 will then begin the above described cycle over again.

The manual quick stop valve 36 is also connected to the high pressure air supply through a conduit 146. This valve is normally in the position shown and flow through it is blocked. Should the operator desire at any point in the operating cycle to retract spindle 72, pushing the valve 36 to the opposite position will cause high pressure air to be connected through a conduit 146, a conduit 148, and conduit 142 to actuator 144, moving valve 110 to its initial position, thus cutting off the high pressure air supply to the left side of piston 80, and permitting such pressure to be exhausted through the exhaust port on the left side of valve 35 and causing quill 70 and spindle 72 to retract as described above.

To make sure that the electric motor does not operate when the chip guard 31 is open, an interlock 150 is connected to the chip guard and to an actuator 151 which, as shown, is spring loaded to open switch 153. When chip guard 31 is closed interlock 150 is moved to the opposite position while valve 110 is also in the opposite position, high pressure air is connected through line 113 and interlock 150 to an actuator 151 compressing its spring and arming switch 153. The operator may then close manual switch 50 connecting power to motor 22.

Figure 4:
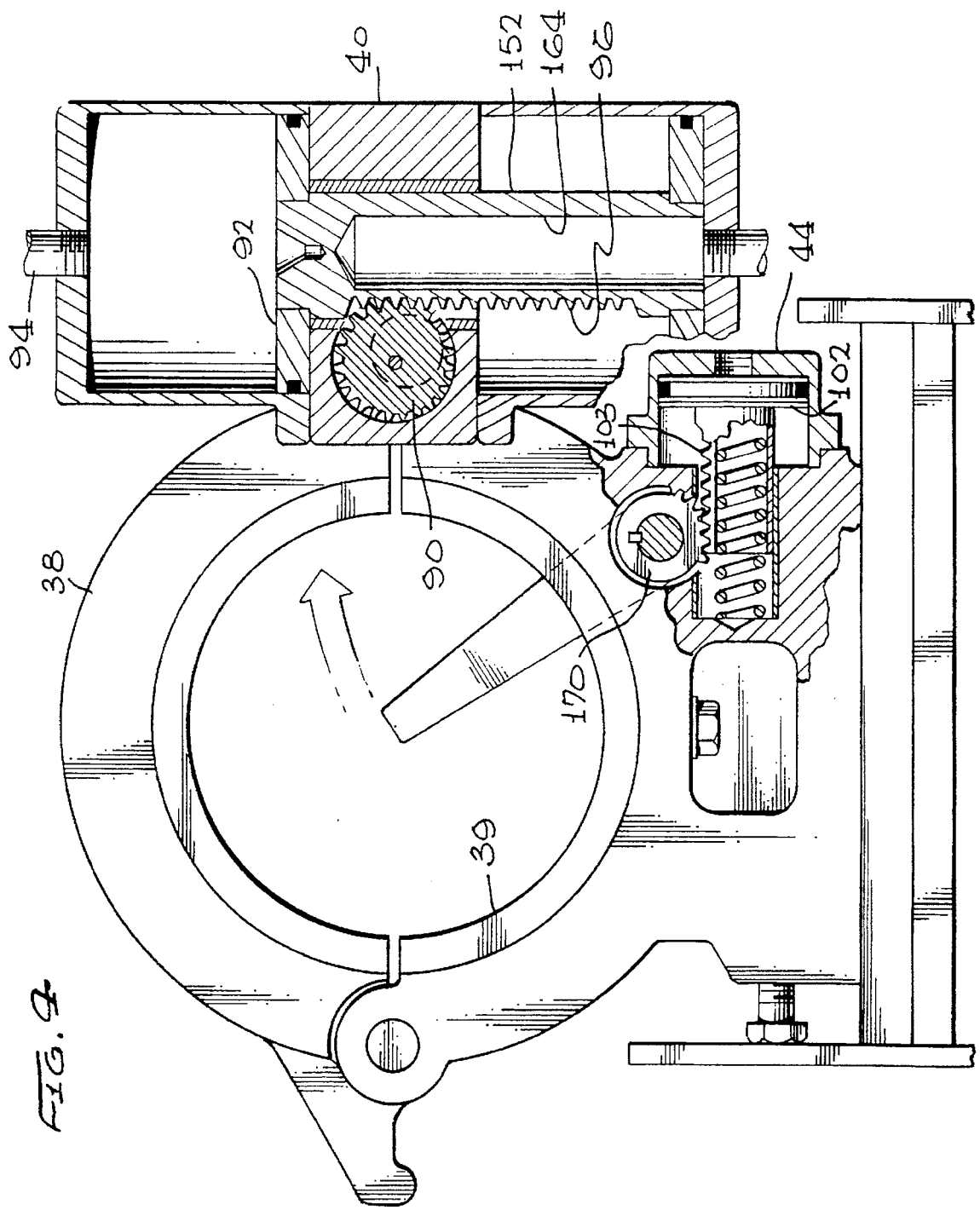
FIG. 4 is an enlarged view, partly in section, of the vise and stop actuating mechanisms shown schematically in FIG. 3.

FIG. 4 is an enlarged view, partly in section, of the vise 38, vise actuator 40 and stop actuator 44. As shown in FIG. 3, vise actuator 40 is initially connected to the air source through a clamp valve 98 and a conduit 93 communicating air pressure to the bottom of piston 92 and forcing piston 92 upwardly. Air at the top of piston 92 is forced out through line 94 and through clamp valve 98 to a baffled exhaust port. Formed on the side of a rod 152 forming part of piston 92 is a rack 96 which meshes with a gear on eccentric actuator 90 which opens and closes the vise 38. This initial upward movement of the piston 92 opens vise 38.

When the operator operates foot pedal 112, air under pressure is supplied to the actuator on clamp valve 98, moving this actuator to its opposite position. This connects line 116 to line 94 putting high pressure air on the upper side of piston 92. Simultaneously, line 93 is connected to exhaust, so piston 92 will move downwardly, rotating the eccentric member 90 in a direction to close vise 38 on the workpiece. High pressure air is also supplied to restriction and check valve unit 104 (FIG. 3) through line 105 and to piston 102 which translates rack 103 toward the left to rotate a gear and hence, stop member 42 in the direction indicated by the arrow. Because it is desired that the stop 42 remain in place until the workpiece is firmly clamped in position by the vise 39, the restriction or bleed in unit 104 operates to delay the build up of pressure against piston 102 for a significant period before the piston moves to rotate stop member 42.

When air pressure is removed from the actuator on clamp valve 98, it changes to its initial position and high pressure air is exhausted from the top of piston 92 through line 94 and from the right side of piston 102 through the open check valve in unit 104 and line 105 to exhaust. This restores high pressure to the bottom of piston 92, pushing it upwardly and opening vise 38. It also causes stop 42 to move back to its original position.

Figure 5:
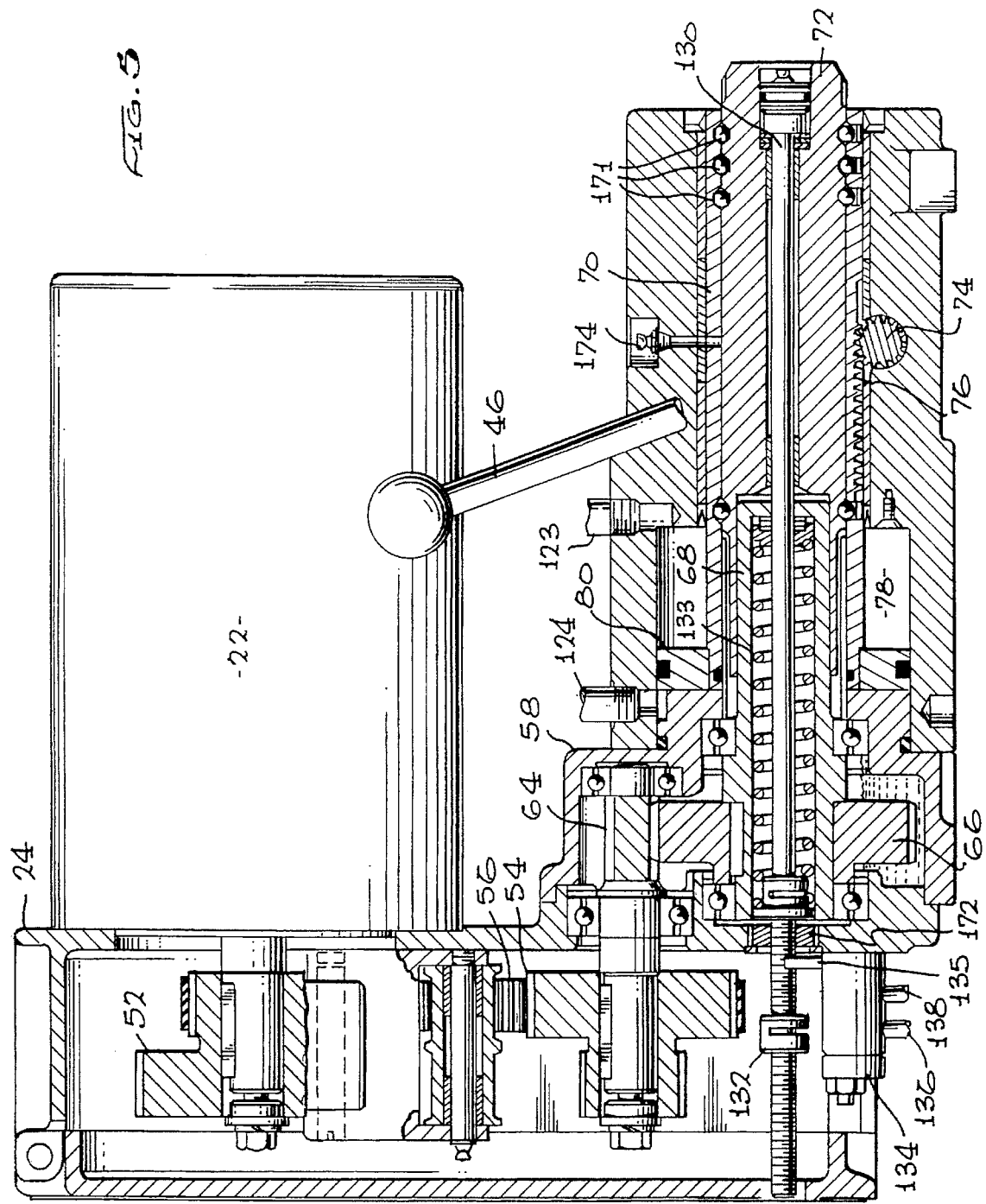
FIG. 5 is a sectional drawing, on an enlarged scale, of the spindle and drive assembly shown in FIG. 3.

FIG. 5 is a sectional view on a larger scale of the spindle and drive structure shown in FIG. 3 including the electric motor 22, the two double step gear belt pulleys 52 and 54 and the toothed drive belt 56. Drive belt 56 drives pulley 54 as discussed above, which drives shaft 58 carrying a small gear 64 driving a larger gear 66 providing a large speed reduction. Gear 66 is secured to spindle shaft 68 which rotates with gear 66. Spindle shaft 68 is keyed to cause rotation of the spindle 72 which rides in integral bearings 171 on quill 70. Quill 70 is axially movable either manually by means of handle 46, gear 74 and rack 76 or by air pressure as discussed above. Thus, spindle 72 is rotatable with spindle shaft 68 and is axially movable as quill 70 is moved axially. As spindle 72 moves axially, it carries with it the draw bar 130 and the stop 132. As shown, the spindle 72 is at its fully retracted position. At the opposite end of its travel draw bar 130 carries stop 132 to the right until it makes contact with trip arm 135 of return valve 134 which reverses valve 110 as described above and stops travel of piston 80 and spindle 70. A grease fitting 174 provides a means for lubricating the bearings and adjoining surfaces of quill 70 and spindle 72.

FIG. 6 is a fragmentary end view, partly in section, of the spindle and drive assembly of FIG. 5. The housing of the spindle assembly 28 is shown broken away to disclose the structure of the manual means for translating the spindle 72 and also the physical orientation of the housing 84 and rack 82 which are driven by gear 77 to operate the hydro-check rapid travel mechanism 88.

Gear 74 is rotated by the axial travel of quill 70, as set forth above. When manual operation is desired, the handle 46 is first pushed inwardly against the spring 175 (toward the right on FIG. 6). Handle hub 46A has an integral dowel pin 175A that engages a notch 74A in the hub of gear 74 rotating gear 74 as desired. This rotates a second gear 77 which translates rack 82.

FIG. 7 is a view of the spindle and drive assembly 28 from the rear side of the machine with housing 84 shown partly in section, and showing rack 82. The end of gear 77 is shown in phantom. Translation of rack 82 moves adjustable screw 86 such that at a desired part of its travel it impacts a plunger 176 of the hydrocheck device 88. The adjustable rate oil filled hydro-check device 88 sets the cutter feed rate. The distance screw head 86 travels before it hits the hydro-check plunger head 176 sets the spindle rapid travel distance. At the right end of hydro check unit 88 is an adjustment screw 89 which varies the position of an adjustable internal needle valve to vary the adjustable feed rate.

Extending outwardly from housing 84 and moving with rack 82 is a threaded shaft 85 carrying two knurled adjustment spools which are manually wedged against each other in a well known manner to provide the adjustable stop 83. When stop 83 makes contact with housing 84, travel of rack 82 and, hence, quill 72 is stopped. This stop 83 is readily adjustable by an operator and provides an additional convenient means for limiting the travel of the cutter 33 to different positions for different tasks.

FIG. 8 is a sectional drawing of a spindle and drive assembly including a schematic control drawing of an alternate embodiment of my invention. In this embodiment which is a semi-automatic form of my end finishing machine, many of the parts are identical to those described above and are given the same numerals. Thus the base 12, the electric motor 22, the gear belt drive system 24 including step gears 52 and 54, toothed belt 56, gear box 26, cutter cartridge 30 and the chip guard 31 are all as described above. Also identical with those described above with reference to FIGS. 3 and 4 are the vise and stop assembly 16 with the clam shell type vise 38 and vise actuator 40 and stop 42 with stop actuator 44. Other similar or identical parts will be discussed below.

The spindle assembly 200 is similar to but not identical with that of FIGS. 3 and 5. The driven gear 66 is either fastened to or integrally formed with a hollow spindle shaft 268 which rotates with gear 66. Spindle shaft 268 is a hex drive or keyed member mating with an internal hex drive or key slots in spindle 72 to cause rotation of the spindle 72 which rides in integral bearings 171 on quill 70. Fastened to quill 70 or integrally formed therewith is a piston 80 in a cylinder 78. As quill 70 moves axially, it carries with it the draw bar 130 and stop 132. Operation of the draw bar and stop are as described above. Axial movement of quill 70, which carries a rack 76, also rotates a drive gear 74 on a shaft to which is attached the handle 46 as described above.

The filter-regulator-lubricator 108 is also as described but includes an additional pressure regulator 208 downstream which reduces the air pressure from, for example, 100 psi to 20 psi. Air at 20 psi is supplied through a line 210 to cylinder 78 on the right side of piston 80. The left side of piston 80 is connected to outside air through a port 212. Directly connected to the 100 psi source 108 through a line 214 is a control valve 216 which is movable by means of an actuator 218.

Handle 46 has a detent in its hub which communicates with valve 220 via the valve's cam actuator 220A connected to the 100 psi air supply through a line 222. Initial movement of handle 46 causes valve 220 to connect high pressure air to actuator 218, switching valve 216 to its opposite position. When the chip guard 31 is closed, the interlock valve 150 is moved to its position opposite to that shown, connecting high pressure to air electric switch 151 and arming the electrical circuit which drives motor 22. Motor 22 can then be energized by manually operating switch 50. If chip guard 31 and interlock valve 150 are in the positions shown, no high pressure air is supplied to air electric switch 151 and motor 22 will not operate.

With valve 216 in the position shown, high pressure air is connected to the bottom of piston 92 in actuator 40. This causes piston 92 to be moved to its upper position, exhausting air through line 94, valve 216 and exhaust port 226 and opening vise 38. Actuator 44 is also connected to exhaust port 226 through valve 216 so that stop 42 is held in the position shown by spring 228 in actuator 44. When valve 216 is moved to its other position, high pressure air is supplied through valve 216 and line 94 to the top of piston 92 which closes the vise 38 on the workpiece as described above. High pressure air is also supplied through a restriction 230 in a line 232 connected to actuator 44. Because of the restriction, the piston in actuator 44 does not move to carry stop away from the workpiece 20 until vise 38 has firmly secured the workpiece.

Operation of the semi-automatic embodiment is essentially as follows:

1. Turn on the main electric switch 50 which arms the motor 22. Turn on the air supply. This opens the vise 38 if not already open and connects 20 psi air pressure to chamber 78 which acts as an air spring.
2. Place workpiece in position against stop 42.
3. Close chip guard 31 if not already closed. This operates interlock 150 and air-electric switch 151 closing switch 153.
4. Begin to move handle 46 to translate quill 70 and spindle 72. This moves actuator 220A to switch valve 220 causing vise 38 to close, actuator 44 to move stop 42 out of the position shown after a short delay, and the motor 22 to start.
5. Continue to move handle 46 against the air spring in chamber 78 to perform the cutting or forming operation on the workpiece 20. Depending upon how it is adjusted, but usually at about midway of the stroke, increased resistance is felt indicating operation of the hydrocheck device 88. Further movement of handle 46 moves cutter cartridge 30 or similar tool against workpiece 20 performing the desired operation until stop 83 bottoms out against its housing.
6. Releasing the handle 46 lets the spindle return to its original position. This switches valve 220 back to its position shown, which deactivates actuator 218 and switches valve 216 back to its original position. This cause vise 38 to open, stop 42 to be moved back to the position shown and motor 22 will stop. The workpiece can then be removed and replaced and the cycle repeated by again operating handle 46.

A further embodiment of my invention appears on FIG. 9. This embodiment is similar to the fully automatic machine described above but is modified to provide and operate an internal mandrel assembly for securing a pipe or tube workpiece from the inside rather than clamping from the outside. One significant feature of this embodiment is that the i.d. (internal diameter) gripping mechanism mechanically self-centers the stock to the spindle centerline. This is especially critical when machining larger diameter thin wall stock, where sometimes the diameter tolerance is greater than the wall thickness, making a symmetrical cut with earlier embodiments impossible. FIG. 9 is a sectional drawing of this machine including a schematic drawing of the control circuit. Many parts of the machine and the control circuit are identical to those shown and described in connection with FIG. 3 and have been given identical numerals. Others are somewhat or entirely different and have been given numerals in the 300 series.

The motor 22 is connected to the source of electrical power 48 and drives the gear box 24 as described. Gear 66 in gear box 24 turns a hollow hex-drive member 301 which drives the spindle 72. Attached to the spindle 72 is a cutter 30 which carries a specialized cutting tool 303 which will be different for the various kinds of end finishes desired. A chip guard 31 surrounds, at least partially, the cutter 30 and controls an interlock 150 as described above. The spindle is rotated in the same manner as described above.

Surrounding the spindle 72 is a quill 70 which is formed with or fastened to piston 80 in cylinder 78. Formed on the outside of spindle 72 is a rack 76 engaged with a gear 74 such that translation of the rack 76 rotates gear 74 and vice versa. Integral bearings 171 are positioned between spindle 72 and quill 70 to permit spindle 72 to rotate within quill 70.

Supported within spindle 72 on bushings 300, 302 is an arbor 304 through which passes a drawbar 305. Carried at the end of drawbar 305 and inside of workpiece 306 is a mandrel structure 303 consisting of a plurality of gripper members 308, each having a cross section like a sector of a circle and which are combined to form a generally cylindrical structure having a tapered inner surface. Expandable and contractible coil spring or rubber band members 310 surround members 308. A plurality (typically 8) of tapered pins 312 are secured to a cylindrical member 314, which is, in turn secured to the end of the drawbar 305 by means of a nut 307 and snap ring 307A. As drawbar 305 is moved toward the left, pins 312 urge gripper members 308 outward urging members 310 against the inside of the workpiece 306. Movement of drawbar 305 to the right along with cylinder member 314 withdraws tapered pins 312, permitting gripper members 308 to move inwardly due to the retracting forces of coil spring members 310 and releasing workpiece 306.

Draw bar 305 moves axially within arbor 304 and is threaded into a collar 318 integral with cylindrical pins 320 actuated by the enveloping yoke at the end of a lever 322. Lever 322 is pivoted at a pin 324 secured in the housing and is attached at its opposite end to a piston rod 326 driven by a piston 328 in a cylinder 330. Cylinder 330 is pivotally fastened to a mounting block 332 on the machine base 334 by means of an extension 336 pinned to block 332 by means of a pin 338.

The air-electric control system for the machine of FIG. 9 is very similar to that described above in connection with FIG. 3. Air under pressure is supplied to the filter-regulator 108 which is then connected to manifold 106. As shown in the solid lines, air is initially supplied through line 116 to a control valve 110 which is operated by pedal 112 and also by air actuator 144. Air to valve 110 goes directly to a double valve 35 where it is blocked. Air in line 116 is also blocked at the manual-automatic selector valve 34 and is supplied through clamp valve 98 to a line 340 connected to cylinder 330 on the right side of piston 328. With the valves in the positions shown, the only effect of providing air to the system is to force piston 328 toward the left, pivoting lever 322 around pin 324 and forcing the centerline drawbar 305 to the right which puts mandrel members 307, 312 and 214 in a retracted position releasing any workpiece 306 which may be present.

A stop member 340 limits movement of a newly placed workpiece toward the left prior to its being secured in position by the mandrel. Stop member 340 is carried on a short shaft 342 to which is fastened a gear 344. A rack 346 is spring loaded toward its illustrated position by means of a spring 348 in a cylinder 350. Spring 348 is contained at its lower end by a piston 351 in cylinder 350. Cylinder 350 is connected through a conduit 352 to a flow control valve system which consists of paralleled adjustment valve 362 and check valve 354. Valve 354 and the left side of piston 328 are both connected through clamp valve 98 to a baffled exhaust port 113.

With a new workpiece 306 positioned on the mandrel 303 and against stop 340, with chip guard 31 in position, and the manual-automatic selector valve 34 in the position shown, both sides of piston 80 are connected to exhaust at valve 35, so piston 80 will not move to translate the quill 70 and spindle 72. The machine is then set up for manual operation. When the operator touches pedal 112, valve 110 changes position connecting air under pressure through conduit 356 to the actuator 358 on clamp valve 98, changing its position. This supplies high pressure air through a line 360 to the left side of piston 328 while the opposite side is connected to exhaust through conduit 341 and clamp valve 98. This causes piston 328 to move to the right, pulling drawbar 305 to the left and tightening the mandrel structure 303 against the inside of workpiece 306, securing it in position. High pressure air is also connected through line 352 and adjustable restriction 362 to the lower side of piston 351 operating rack 346, rotating gear 344 and moving stop 340 away from the workpiece 306. The restriction 362 insures that mandrel 303 has time to secure the workpiece 306 before air builds up sufficiently to overcome spring 348 and actuate stop 340.

At this point with the chip guard 31 in position, interlock 150 permits high pressure air to reach actuator 151 every time the operator actuates pedal 112 actuating the electrical circuit by closing switch 244. The operator has previously manually turned on switch 50 to electrically arm the motor 22 which rotates spindle 72. The operator then moves handle 46, translating the quill 70 and spindle 72 to put the cutting or forming tool in position to chamfer or otherwise finish the end of workpiece 306. Movement of quill 70 in the extended direction is limited by the setting on stop 83, as described above.

This arrangement, of course, permits the proper cutting or forming tool to finish the end of workpiece 306 in a number of ways for a significant distance beyond its actual end. When the end has been formed, the operator releases handle 46 allowing it to return to its original position, withdrawing the quill, spindle and cutting tool, which action is aided by the air under compression in chamber 78.

Automatic operation is much like that described above with respect to FIG. 3. With a workpiece 306 and chip guard 31 in place, the motor 22 off but armed and spindle 72 stationary, the auto-manual selector valve 34 is moved to its position opposite to that shown, supplying high pressure air to the actuators on double valve 35 and switching these valves to their positions opposite to that shown, thus arming the system for automatic cycling. When the operator steps on foot valve 112/110, clamp valve 98 is moved by actuator 358 which connects high pressure air to the left side of piston 328 and causing this piston to move quickly to the right, rotating lever 322 around pin 324 and pulling drawbar 305 to the left causing mandrel 303 to expand and clamp workpiece 306 in place. High pressure air is also connected through restriction 362 to the lower side of piston 351 moving it upwardly to rotate gear 344 and moving stop 340 away from the workpiece 306 and also to piston 151 closing switch 153 energizing motor 22 and causing spindle 72 to rotate.

In this mode, spring loaded handle 46 is disengaged from gear 74. High pressure air is supplied through a line 124 to the left side of piston 80 building in pressure over a finite time. The system is designed so that much less air pressure is required to actuate valve 358 than to actuate piston 80, thus piston 328 will always complete its movement before piston 80 begins to move. The right side of piston 80 is connected through line 123 and valve 35 to an exhaust port 114. This moves the quill 70 and spindle 72 to the right to put cutter member 30 in position to perform the desired finishing operation on workpiece 306. Thus, once the workpiece 306 is positioned against stop 340, the operation of stepping on the pedal 112 causes the mandrel 303 to expand and secure the workpiece in position and the motor 22 to start. Next, stop 340 is removed, and then the spindle is translated to move the cutter into operation to perform the desired end finishing operation in the desired sequence.

Also present in the embodiment of FIG. 9 is the gear 77 on the rear side of the machine which drives rack 82 which operates the hydro-check unit 88. The operation of hydro-check unit 88 is the same as described in connection with FIG. 3. In this embodiment, however, a valve 372 externally of the housing 84 of rack 82 carries an arm 366 attached to a shaft 368 loaded by a spring 370. The spring 370 normally holds valve 372 in the position shown, where it has no effect. When the cutter 33 or the forming tool reaches the end of its cutting cycle, stop 83 is moved through movement of rack 82 to a position where it contacts arm 366, communication is opened between a high pressure air line 374 and a line 376 connected through a time delay unit 378 to actuator 144. This forces control valve 110 back to its original position instantly bringing high pressure to the right side of piston 80.

At this point there is substantial pressure (such as 100–120 psi) remaining on the left side of piston 80. This pressure will dissipate through exhaust port 114 over a finite period during which piston 80 moves to the left but will retain at least 40 psi until piston 80 is moved all the way to the left. This pressure is enough to keep actuators 358 and 151 actuated, allowing the spindle 72 to always fully retract before the workpiece is unclamped, the stop 340 is moved back and the motor stops, achieving the desired sequencing without requiring the usual extra control valve. As this pressure through line 124 drops in value it reaches a point where it can no longer hold actuator 358 in position and clamp valve 98 switches to its original position, connecting high pressure to the right side of piston 328 and retracting mandrel 303. With check valve 354 forced open, stop 340 moves quickly back to its original position. Also, at this time spring loaded piston 151 retracts, opening switch 153 and motor 22 stops. The workpiece 306 has thus been released and may be removed and a new workpiece installed.

The embodiment of FIG. 9 includes a "quick-stop" control 36 which is essentially the same as that of FIG. 3. As illustrated in FIG. 9, the air connection to line 364 is blocked. When the operator changes the position of control valve 36, high pressure air is connected through lines 336 and 364 and manifold 106 to actuator 144, which then changes the position of valve 110, causing the spindle and quill to retract under the force of the pressure in chamber 78.

FIG. 10 is a sectional drawing of a semiautomatic version of the end finishing machine using an inside gripping mandrel according to the invention, including a schematic diagram of the control circuit. In this embodiment the parts described are all identical with parts described in relation to FIGS. 8 or 9 and are given the same numerals. The system of FIG. 10 includes the motor 22 with its electrical connections including an arming switch 50, cycle actuated interlock piston 151, controlling switch 224, gearbox 24, spindle assembly 200 including the spindle 72, quill 70 and cutter cartridge 30. Spindle 72 is fastened to a piston 80 movable in a chamber 78. The spindle is rotated through a hex-drive member 301 driven by gear 66. A stationary arbor 304 is spaced from the interior of spindle 72 by means of bushings 300, 302. Carried within the gear 66 and arbor 304 is a centerline drawbar 305 to which is attached the mandrel assembly 303. Drawbar 305 and mandrel assembly 303 are identical to that described above with respect to FIG. 9.

As described above, the high pressure air supply is connected through a line 214 to a control valve 216 movable by means of an actuator 218. Air at a reduced pressure is supplied from regulator 208 only to cylinder 78 on the right side of piston 80. Control valve 216 is positioned such that high pressure air is connected through line 214 and valve 216 to cylinder 330 on the right side of piston 328. Air on the left side of piston 328 is connected to an exhaust port 113 through a line 352 and control valve 216. Also connected to exhaust port 113 through line 352 is piston 351 which is held in its illustrated position by means of spring 348 thus holding rack 346, gear 344 and stop 340 in the positions shown.

Initial movement of handle 46, through a detent is its hub displaces a cam roller 220A on valve 220 which connects high pressure air through line 222 to actuator 218 on control valve 216 and to actuator 151, closing switch 153 and closing the circuit to motor 22. Operating actuator 218 reverses valve 216 and reversing the pressure on piston 328, causing piston 328 to move to the right, pivoting lever 322 around pin 324 and moving drawbar 305 toward the left, expanding mandrel 303 against the inside of tubular workpiece 306 and securing it in position. At the same time high pressure air is connected through line 352 and adjustable restriction 362 to the lower side of piston 351 causing it to move upwardly carrying rack 346, rotating gear 344 and moving stop 340 away from workpiece 306. The adjustable restriction causes a slight time delay on the stop 340 allowing the workpiece to be clamped first.

The operator may then, assuming chip guard 31 is closed and manual switch 50 is closed, further move handle 46, rotating gear 74 and translating rack 76 and cutter cartridge 30 to the workpiece to perform the desired finishing operation. Movement of gear 74 also moves gear 77 and rack 82. As rack 82 moves to the left an amount set on adjustable screw 86, it contacts the plunger 176 on the hydro-check device 88 increasing the resistance to movement of the spindle assembly by an amount established by the setting on the variable restriction 88A. Further movement of rack 82 causes the adjustable spindle stop 83 to contact the housing 84 thus stopping further travel of the spindle and cutter. At this point the finishing operation is concluded and the operator releases handle 46 allowing it and spindle 70 to return to its original position. Roller cam 220A and hence valve 220 are returned to their original positions, cutting off high pressure to actuator 218 and actuator 151 and its electric switch 224. This returns valve 216 to its at rest position, reversing the pressure on piston 328 and causing mandrel 303 to retract, releasing the workpiece 306. Air pressure is also released from the lower side of piston 351 causing stop 340 to rotate to its original position. At this point the operator may remove the finished workpiece and insert a new one which will be positioned over the mandrel 303 and against stop 340.

From the foregoing, it will be seen that the semi-automatic embodiments described above include many of the advantages of the full automatic machines but are somewhat less expensive and simpler in construction, and are very practical where end finishing runs of any particular part are limited.

Figure 11:
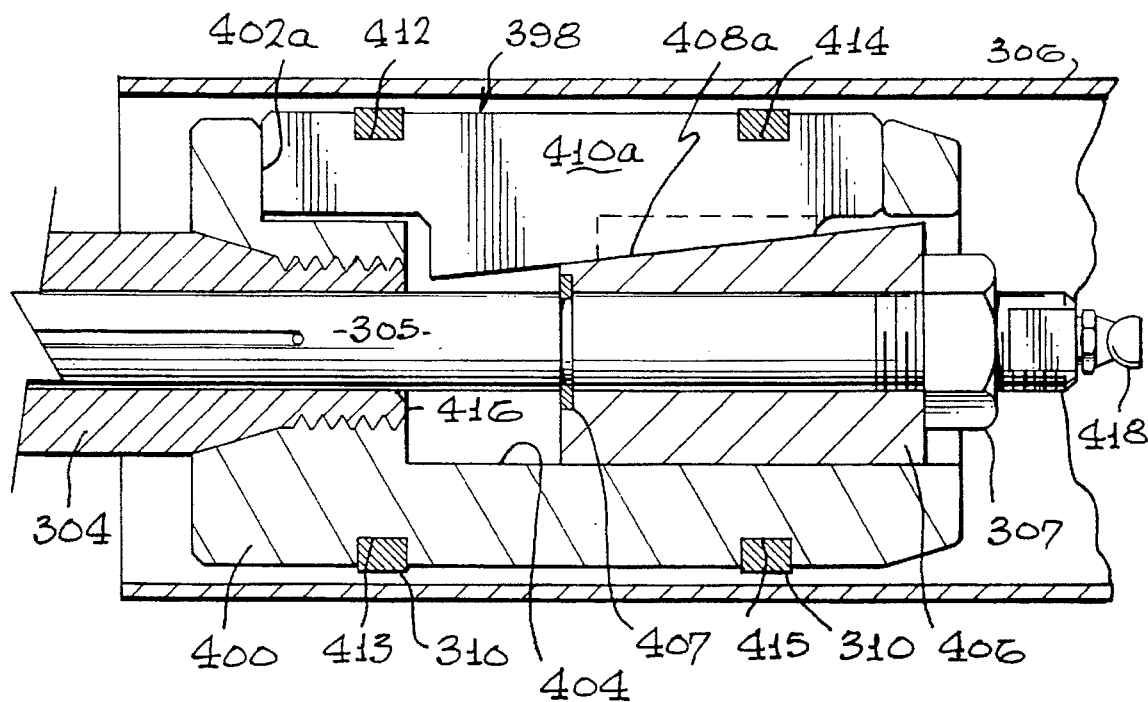
FIG. 11 is a sectional drawing of an improved inside gripping mandrel used with the embodiments of FIGS. 9 and 10.
Figure 12:
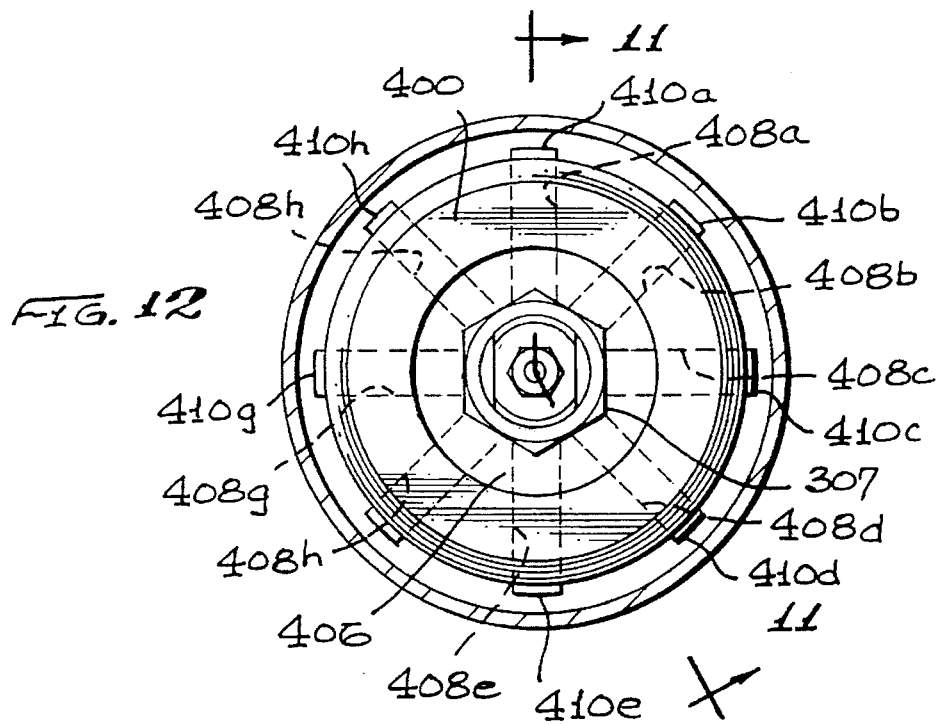
FIG. 12 is an end view of the mandrel of FIG. 11.

FIG. 11 is a cross-sectional view taken along line 11—11 of FIG. 12. FIG. 12 is an end view of an alternate and preferred form of mandrel assembly 398, which may be substituted for the mandrel assembly 303 shown in FIGS. 9 and 10. Some parts are the same as those shown in FIGS. 9 and 10 and have been given the same numerals. Thus, the mandrel assembly 398 is carried on drawbar 305 which is axially movable within arbor 304. The mandrel blades 410 operate to secure and release a workpiece 306. Carried on and fixed to arbor 304 is a bladeholder 400 which is generally cylindrical but which includes a coaxial internal passage for receiving the arbor 304 and drawbar 305 and a larger diameter coaxial internal cylindrical chamber 404. Positioned in cylindrical chamber 404 is a generally cylindrical blade cam 406 which is secured to drawbar 305 by means of a split ring keeper 407 and by a hex nut 307. Blade cam 406 includes a series of eight evenly spaced tapered radial grooves 408a–h. These radial grooves are in radial registry with a series of eight radial grooves 402a–h on bladeholder 400, of which only groove 402a is shown on FIG. 11. Carried in grooves 402a–h and grooves 408a–h are a series of eight tapered blades 410a–h. Each of blades 410a–h is notched on its outer edge as shown at numerals 412 and 414 and bladeholder 400 has circumferential notches 413 and 415 aligned with notches 412 and 414 respectively.

Placed in these notches are flexible contact members 310, which may be rubber bands or spiral spring bands, as described in connection with FIG. 9. A grease fitting 418 on the end of drawbar 305 provides a means for lubricating the internal parts of mandrel 398. Operation of the mandrel of FIGS. 11 and 12 is generally similar to that of FIGS. 9 and 10. When drawbar 305 is moved to the left, blades 410a–h are caused to ride up ramp surfaces in grooves 408a–h of blade cam 406 until they carry blade members 410 firmly against the interior surface of workpiece 306. This secures workpiece 306 so that the desired chamfering or other end finishing may be done. Subsequent movement toward the right of drawbar 305 carries blade cam 406 to the right, releasing the pressure exerted by blade cam 406 on blades 410a–h and permitting these blades to move inwardly under the compressive force of flexible contact members 310 and releasing workpiece 306. Members 310 have not been shown on FIG. 12 since their structure is believed to be clear and such showing would tend to make FIG. 12 more difficult to follow.

The above described embodiments of the present invention are merely descriptive of its principles and are not to be considered limiting. The scope of the present invention instead shall be determined from the scope of the following claims including their equivalents.

I claim:

1. An end finishing machine for forming a workpiece including a spindle and drive assembly, means fastened to said spindle for finishing said workpiece, and drive means for rotating said spindle;

a quill surrounding said spindle and means for translating said quill, said means including a rack on said quill, a gear connected to said rack, and means for rotating said gear;

means for securing said workpiece including an actuator;

control means including a source of fluid under pressure and valve means connected to said source; and means responsive to said valve means for connecting said source to said actuator for operating said securing means to secure said workpiece;

stop means having an arm for locating said workpiece in position for forming; and means responsive to operation of said valve means for retraction of said stop means delayed until after said workpiece is secured.

2. A machine as claimed in claim 1 wherein said drive means includes an electric motor and a transmission including a plurality of multi-step gear belt pulleys for variable speed cutting;

and wherein said means for translating said quill comprises a manual control.

3. A machine as claimed in claim 2 wherein said transmission has a plurality of shafts and said gear belt pulleys are interchangeable on said shafts to provide a plurality of speed ratios; and wherein said manual control is operative to additionally operate said valve means.

4. A machine as claimed in claim 1 wherein a second rack is connected to said gear, a threaded shaft is operatively connected to said second rack, and stop means is positioned on said shaft for limiting the travel of said quill.

5. A machine as claimed in claim 1 wherein said spindle includes an axial passageway therethrough, a drawbar is positioned in said passageway, and said drawbar includes an adjustable stop limiting travel of said spindle.

6. A machine as claimed in claim 5 wherein said workpiece is tubular, said securing means includes an expandable mandrel adapted to be placed within said workpiece and connected to said drawbar, and means are connected to said drawbar for expanding said mandrel, said means being responsive to said valve means.

7. A machine as claimed in claim 6 wherein said expandable mandrel includes a member having ramp surfaces, and said expanding means includes members having tapered surfaces adjacent said ramp surfaces, said drawbar is connected to said member having ramp surfaces, and means connecting said drawbar to said actuator to translate said member having tapered surfaces to expand said mandrel.

8. An end finishing machine for forming a workpiece including a housing, a spindle carried in said housing, forming means carried on said spindle;
   drive means for rotating said spindle;
   securing means for securing said workpiece in position;
   characterized in that said housing includes a quill surrounding said spindle, a rack formed on said quill, a gear connected to said rack, a cylinder and a piston in said cylinder connected to said quill, a source of fluid under pressure, a fluid conduit connecting said source to said cylinder, valve means connected between said source and said securing means, and operator-operated means connected to said valve means for directing said fluid under pressure to said securing means; and
   including stop means having an arm for locating said workpiece in position for forming; and means responsive to operation of said valve means for retraction of said stop means delayed until after said workpiece is secured.

9. A machine as claimed in claim 8 wherein said operator-operated means connects said valve means between said source and said cylinder and said piston responds to substantially higher fluid pressure than does said securing means such that said securing means responds to opening of said valve means more quickly than does said piston.

10. A machine as claimed in claim 8 wherein said drive means includes an operator-operated handle and means connecting said handle to said gear.

11. A machine as claimed in claim 8 wherein said workpiece is tubular, said securing means includes an expandable mandrel adapted to be placed within said workpiece, and means are connected to said mandrel for expanding said mandrel, said means being responsive to said valve means.

12. A machine as claimed in claim 11 wherein said expandable mandrel includes members having internal ramp surfaces, and said expanding means includes a member having tapered surfaces adjacent said ramp surfaces, a drawbar connected to said member having tapered surfaces, an actuator connected to said drawbar and means connecting said drawbar to said actuator to translate said member having tapered surfaces within said members having internal ramp surfaces to expand said mandrel.

13. An end finishing machine for forming a workpiece and drive assembly means fastened to said spindle for finishing said workpiece, and drive means for rotating said spindle;
   a quill surrounding said spindle and means for translating said quill, said means including a rack on said quill, a gear connected to said rack, and means for rotating said gear;

means for securing said workpiece including an actuator;
   control means including a source of fluid under pressure and valve means connected to said source;
   means responsive to said valve means for connecting said source to said actuator for operating said securing means to secure said workpiece; and
   wherein said securing means includes a vise, a stop device is included comprising an arm, resilient means urging said arm to a position to limit travel of said workpiece, an actuator connected to said arm, and a conduit connecting said actuator to said source to move said arm away from said position, said conduit including time delay means to delay movement of said movable arm until after said vise has closed on said workpiece.

14. An end finishing machine for forming a workpiece and drive assembly means fastened to said spindle for finishing said workpiece, and drive means for rotating said spindle;
   a quill surrounding said spindle and means for translating said quill, said means including a rack on said quill, a gear connected to said rack, and means for rotating said gear;
   means for securing said workpiece including an actuator;
   control means including a source of fluid under pressure and valve means connected to said source;
   means responsive to said valve means for connecting said source to said actuator for operating said securing means to secure said workpiece; and
   wherein said means for translating said quill includes a cylinder, a piston in said cylinder secured to said quill, conduit means connecting said valve means to said cylinder, said means responsive to said valve means including a movable wall device connected to said actuator being responsive to a substantially lower fluid pressure than said piston whereby said actuator responds to said valve means substantially more quickly than does said piston.

15. A machine as claimed in claim 14 wherein said quill is translated between a retracted position and an operating position and resilient means is operatively connected to said quill for opposing the fluid pressure is said cylinder urging said piston toward said operating position.

16. A machine as claimed in claim 14 wherein a stop device is included including an arm, a spring urging said arm to a position to limit travel of said workpiece, a fluid pressure responsive member acting in opposition to the force of said spring, and
   a second actuator is connected to said valve means and to said fluid pressure responsive member including a second movable wall device being responsive to a substantially lower pressure than said piston whereby said second actuator responds to said valve means more quickly than does said piston.

17. A machine as claimed in claim 16 wherein the connection between said second actuator and said fluid pressure responsive member includes a restriction whereby said stop device responds to movement of said valve only after said securing means has secured said workpiece.

18. An end finishing machine for forming a workpiece including support means, a spindle and drive assembly mounted on said support means, and an air-electric control system carried on said support means for controlling operation of said machine;
   said spindle and drive assembly comprising a housing including a quill and a spindle, forming tool means carried on said spindle, drive means operatively connected to said spindle to rotate said spindle, a piston connected to said quill for moving said quill and said spindle axially and means connecting said control system to said piston;

means carried on said support means for securing said workpiece in position including an actuator and means connecting said control system to said actuator; and stop means connected to said control system including an arm movable to limit travel of said workpiece.

19. A machine as claimed in claim 18 wherein said securing means is a vise, a manifold is connected to said control system, said actuator is connected to said manifold to receive air under pressure at the same time as said piston, flow control means is connected in said control system, and the opposite side of said piston is connected to exhaust through said flow control means causing said vise to close before said spindle moves said forming tool means to said workpiece.

20. A machine as claimed in claim 18 wherein said air-electric control means includes a source of air under pressure, a manifold connected to said source, and operator-operated means connected to said manifold for controlling a flow of said air under pressure to said piston.

21. A machine as claimed in claim 18 wherein said drive means includes an electric motor and a transmission including a plurality of multi-step gear belt pulleys, said transmission having a plurality of shafts and said gear belt pulleys being interchangeable on said shafts to provide a plurality of speed ratios.

22. A machine as claimed in claim 18 wherein said stop means includes a second actuator connected to said control system, and time delay means connected between said second actuator and said control system to delay movement of said second actuator until said first named actuator has closed said vise on said workpiece.

23. A machine as claimed in claim 18 wherein said quill includes a rack, a gear is driven by said rack, means are provided for operatively disconnecting said control means from said piston, and manual means are provided for turning said gear to translate said quill and said spindle.

24. A machine as claimed in claim 18 wherein hydraulic valve means is provided for varying the traverse speed of said quill and said spindle, and an additional rack driven by said gear is movable to initiate the operation of said valve means.

25. An end finishing machine for forming a workpiece comprising a housing, a spindle carried in said housing, forming means carried on said spindle, drive means for rotating said spindle, means for securing said workpiece, a quill surrounding said spindle, means for translating said quill and said spindle, a cylinder and a piston in said cylinder connected to said quill, a source of fluid under pressure, a fluid conduit connecting said source to said cylinder, valve means connected to said fluid conduit between said source and said cylinder, and operator-operated means connected to said valve means for directing fluid under pressure to said piston to move said piston;

characterized in that said means for securing said workpiece includes a first actuator, a first fluid pressure control means connected to said valve means and connected to move said actuator;

a stop for positioning said workpiece prior to its being secured by said securing means, said stop including a spring urging said stop to a first position, a second actuator (for moving said stop to a second position) and a second fluid pressure control means connected to said valve means and connected to move said second actuator;

said first and second fluid pressure control means being responsive to substantially lower fluid pressure than said piston whereby they move said first and second actuators more quickly than said piston is moved.

26. A machine as claimed in claim 25 wherein said connection between said valve means and said second fluid pressure control means includes a restriction whereby said second fluid pressure control means delays movement of said stop means to said second position until said first actuator has secured said workpiece.

27. A machine as claimed in claim 15 wherein a rack is formed on said spindle, a gear is connected to said rack and a valve is provided for operatively disconnecting said source from said piston, and manual means is connected to said gear to translate said quill and said spindle.

28. A machine as claimed in claim 25 wherein said first actuator is connected to said source of fluid under pressure at the same time as one side of said piston, fluid conduits are connected from said source to both sides of said piston, flow control means is connected in one of said fluid conduits connected to one side of said piston, said one side of said piston being connected to low pressure through said flow control means causing said first actuator to actuate said securing means before said spindle advances.

29. An end finishing machine for forming a workpiece including support means, a spindle and drive assembly mounted on said support means, and an air-electric control system carried on said support means including a source of air under pressure and control valve means connected to said source;

said spindle and drive assembly comprising a housing including a quill and a spindle, forming means carried on said spindle, drive means operatively connected to said spindle to rotate said spindle, and translating means including a piston connected to said quill for moving said quill and said spindle axially;

a securing device carried on said support means for securing said workpiece in position including an actuator and means connecting said control system to-said actuator;

stop means including an arm movable to limit travel of said workpiece and pressure responsive means connected to said control system for moving said arm;

and operator-operated means connected to said control valve means for controlling a flow of said air under pressure to said piston, said actuator and said pressure responsive means.

* * * * *